Jan. 4, 1938.  V. LINES  2,104,086
JOINT FILLING DEVICE
Filed April 17, 1937  2 Sheets-Sheet 1
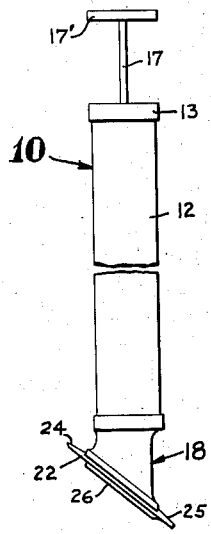
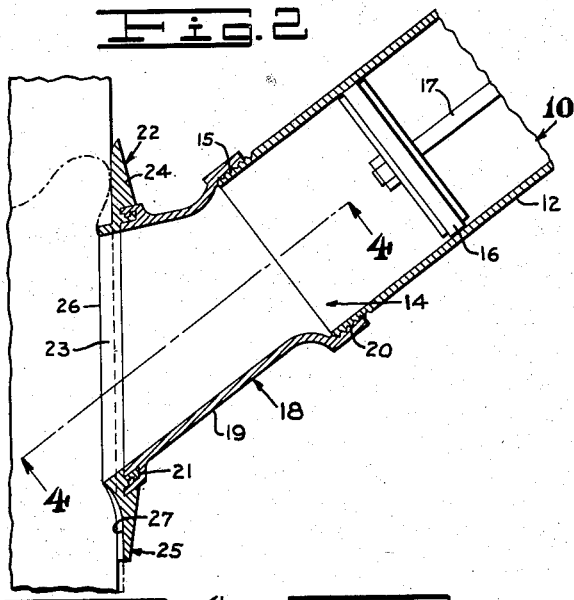
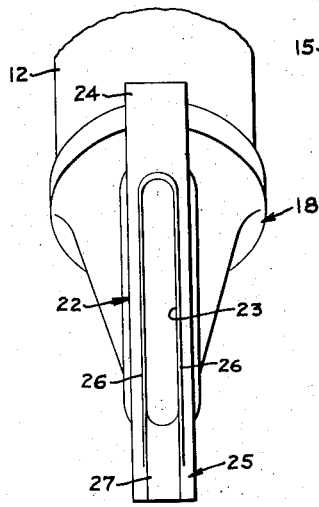
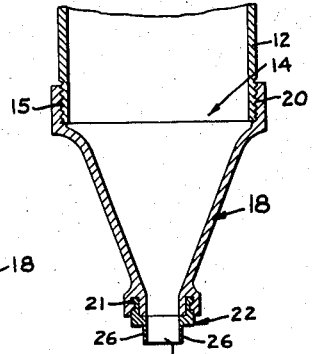
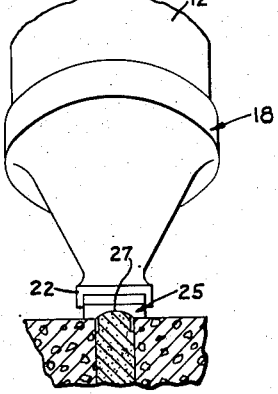
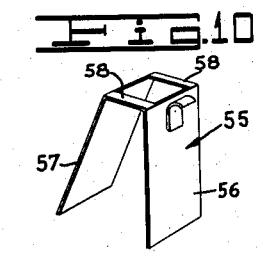
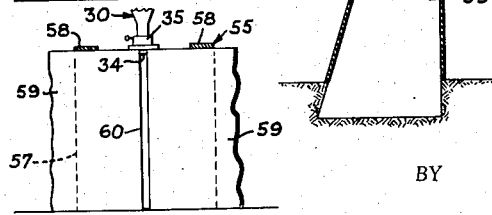
INVENTOR.
Vance Lines.
BY
ATTORNEY.

Jan. 4, 1938. V. LINES 2,104,086
JOINT FILLING DEVICE
Filed April 17, 1937 2 Sheets-Sheet 2
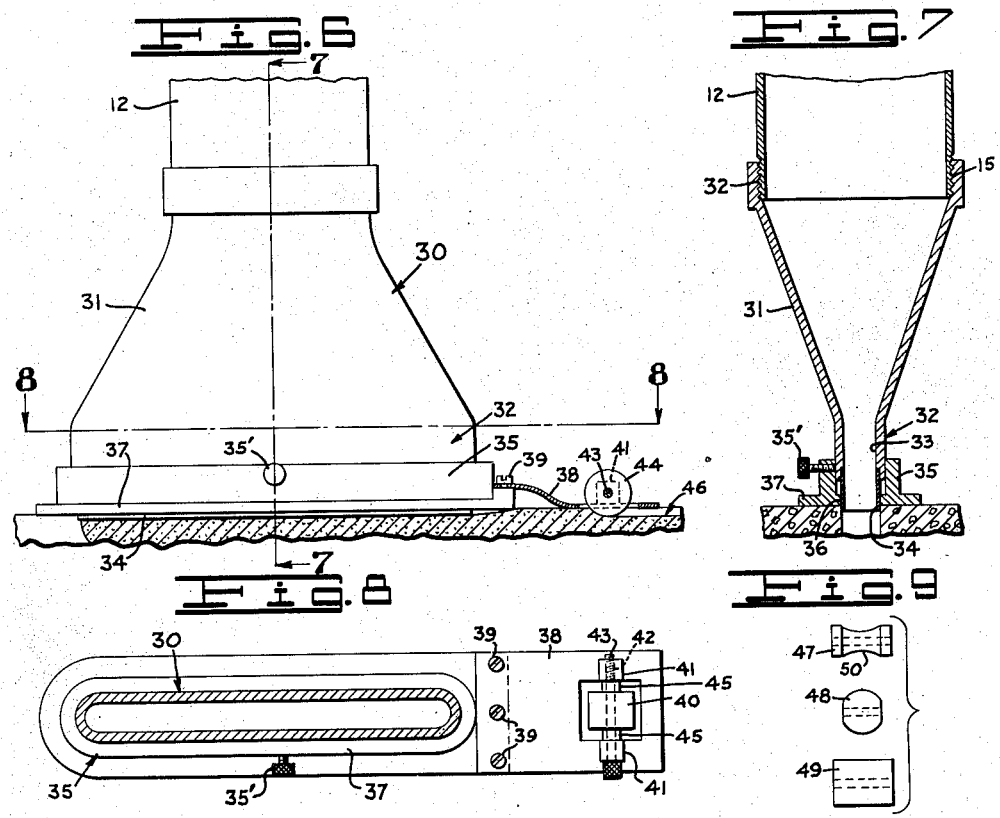
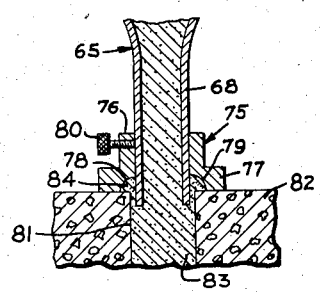
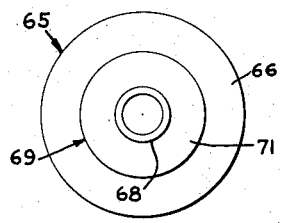
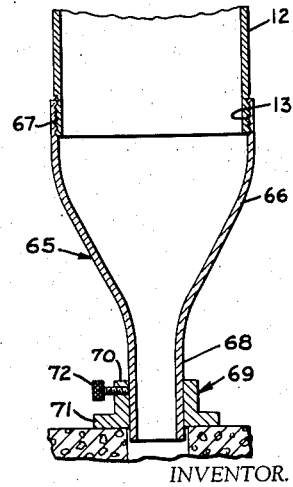
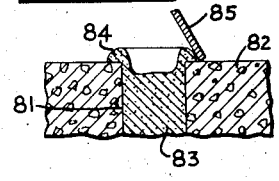
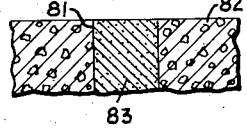
INVENTOR.
Vance Lines.
BY
ATTORNEY.

Patented Jan. 4, 1938

2,104,086

UNITED STATES PATENT OFFICE 2,104,086

JOINT FILLING DEVICE

Vance Lines, Pasadena, Calif.

Application April 17, 1937, Serial No. 137,499

12 Claims. (Cl. 72—128)

This invention relates to improvements in a device for filling a joint such as that between concrete blocks.

The general object of the invention is to provide an improved joint filler wherein a plastic material is used for filling the space between the ends of concrete blocks.

Another object of the invention is to provide a joint filling device including novel means to force semi-plastic material into a joint.

A further object of the invention is to provide a joint filling device including novel means for pointing a plastic joint filling.

Other objects and the advantages of my invention will be apparent from the following description taken in connection with the accompanying drawings, wherein:

Fig. 1 is a side elevation of my improved joint filling device;

Fig. 2 is a fragmentary, enlarged, central section through the joint filling device;

Fig. 3 is a face view showing the trowel portion of the device;

Fig. 4 is a fragmentary section taken on line 4—4 Fig. 2;

Fig. 5 is a fragmentary view showing the trailing edge of the device;

Fig. 6 is a side elevation of a modified form of joint filling device;

Fig. 7 is a section taken on line 7—7 Fig. 6;

Fig. 8 is a section taken on line 8—8 Fig. 6;

Fig. 9 is an extended view in side elevation showing a plurality of different troweling rollers for use with the device shown in Fig. 6;

Fig. 10 is a perspective view of a side guide member for filling seams between cement blocks;

Fig. 11 is an end view of a cement block showing the guide member shown in Fig. 10 in an operative position thereon;

Fig. 12 is a side elevation of a pair of adjacent cement blocks showing the guide member in place thereon partly in section;

Fig. 13 is a fragmentary central sectional view through a filler device for round holes;

Fig. 14 is a bottom plan view of the device shown in Fig. 13;

Fig. 15 is a fragmentary view similar to Fig. 13 showing a modified form of stop member thereon;

Fig. 16 is a sectional view of a pair of adjacent cement blocks showing the shape of the plastic filler after the filler device has been removed; and Fig. 17 shows the joint shown in Fig. 16 after troweling.

Referring to the drawings by reference characters I have shown my invention is a joint filler which is indicated generally at 10. As shown the device 10 includes a cylinder 12 having a closed end 13 thereon. The opposite end of the cylinder 13 is opened as at 14 and externally threaded as at 15. Within the cylinder 13 I provide a suitable piston mechanism 16 mounted on a rod 17 which extends out through the end 13 and is provided with a cross bar handle 17'.

Mounted on the end of the cylinder 12 opposite the end 13 I provide a discharge nozzle mechanism which is indicated generally at 18. As shown the device 18 includes a hollow metal body portion 19 which adjacent one end is internally threaded as at 20 to engage the threads 15 of the cylinder 12. Integrally molded to the body portion 19 as indicated at 21 I provide a trowel member 22. The trowel member 22 has an elongated aperture 23 therein which opens into the interior of the body portion 19.

As shown in Figs. 3 and 4 the side walls 24 and the aperture 23 are thin. The trowel member 22 at its leading end includes a guard member 24 which extends beyond the aperture 23 and at its trailing edge includes a shaping trowel portion 25. The trowel portion 22 is spaced from the outer edge of the nozzle so that when in operative position the end of the nozzle extends into the joint as shown in Fig. 5. The working face of the shaping portion 25 has a curved groove 27 therein approximately the width of the discharge aperture 23.

The side walls 26 of the aperture 23 are exceedingly thin and at the rear end curve upwardly to meet the face of the shaping portion 25. In operation the operator fills the cylinder 12 with the desired plastic material and then places the end of the nozzle member into the joint to be filled and moves the piston 16 towards the nozzle 18. As the piston is thus moved the plastic material is forced out of the nozzle into the joint to be filled (see Fig. 5). As the joint is filled the operator moves the device 10 there along. In so doing the recess portion 27 of the shaping portion 25 allows the plastic material to bow outwardly as shown in Fig. 5.

In Figs. 6 to 9 inclusive I have indicated a modified form of nozzle generally at 30. This nozzle 30 is particularly adapted for filling a long joint as in a wall. As shown the device 30 includes an elongated hollow body portion 31 which at one end is internally threaded as at 32 to engage the threaded portion 15 of the cylinder 12. The opposite end of the body 31 has a narrow elongated neck 32 and an aperture 33 therein in the side walls of which I integrally mold a thin discharge portion 34. Mounted on the neck 33 I provide an adjustable guide member 35 having an aperture 36 therein in which the discharge portion 34 is positioned and having side flanges 37 projecting outwardly from the side walls of the device. The device 35 is provided with a set screw 35' which engages the neck 32 and secures the device 35 thereon in an adjusted position.

On the flange 37 of the trailing edge of the device I provide a flexible flat spring member 38 which is shown as secured to the flange 37 by screws 39. Adjacent the outer end thereof the spring member 38 has an aperture 40. Adjacent each side of the aperture 40 the spring 38 has an aperture 41 thereon one of which is threaded as indicated at 42 to receive the threaded end of a shaft 43. Mounted on the shaft 43 within the aperture 40 I provide a troweling roller 44. The troweling roller 44 as shown in Fig. 8 is of less width than the width of the aperture 40 and so therefore I provide spaced members 45 on the shaft 43.

In operation the discharge portion 34 is positioned in the joint to be filled and the operator forces plastic material into the joint as previously described in connection with Fig. 1. As the plastic material is forced into the joint the nozzle 30 moved there along and as the plastic material leaves the discharge portion 34 it expands and as the roller 44 engages the plastic material it forces it downwardly into the joint a slight distance as indicated at 46. As shown in Fig. 9 the roller 44 may be replaced by either the rollers 47, 48 or 49. The roller 47 includes an inwardly curved portion 50 which is approximately the width of the seam to be filled. When the roller 47 is used in place of the roller 44 the plastic material will bow outwardly from the edge of the joint similar to the manner in Fig. 5.

When the roller 48 is used in place of the roller 44 the plastic material in the joint is bowed inwardly and when the roller 49 is used the plastic material in the joint is formed level with the surface of the adjacent wall member.

In Fig. 10 I have indicated a form member generally at 55 which is especially adapted for use with very plastic materials. This form member includes a back portion 56 and an inclined front portion 57 which is connected by two spaced top strips 58. In use the form 55 is placed over the adjacent ends of two blocks 59 with the strips 58 positioned one at each side of the joint 60 as shown in Fig. 12.

For filling joint 60 I may use the nozzle member 30 with the spring portion 38 thereof removed. As shown in Fig. 11 the discharge portion 34 of the nozzle is positioned in the joint 60. Thereafter plastic material is forced downward into the joint. As the material flows into the joint the front and back portions of the form 55 prevent plastic material from running out the side of the joint.

In Figs. 13 to 14 inclusive I have indicated another modified form of nozzle generally at 65. The nozzle 65 is adapted for filling circular holes with the plastic material. As shown the nozzle 65 includes a hollow body portion 66 which is adjacent one end of the device 67 to engage with threads 13 on the cylinder 12. The opposite end of the nozzle includes the circular neck portion 68 on which a guide member 69 is positioned. As shown the guide member 69 includes the body portion 70 having an enlarged flange 71 thereon to its lower end. The guide 69 is adjustably secured to the portion 68 by set screws 72. To fill an aperture with plastic material with the nozzle 65 the end of the neck 68 is positioned in the aperture as shown in Fig. 13 and thereafter plastic material is forced thereinto until filled.

In Fig. 15 I have indicated a modified form of guide member 75 which may be used on the neck 68 of the nozzle 65 in place of the guide member 69. As shown the guide member 75 includes the body portion 76 having a large flange 77 on the lower end thereof which has a recess 78 therein. As shown the side walls of the recess are curved upwardly and inwardly as indicated at 79. The guide member 75 is shown as adjustably secured to the neck 68 by set screw 80.

In operation the end of the neck 68 is positioned in an aperture such as is indicated at 81 with the face of the plane 66 tightly engaged. The adjacent face of the wall 82 has the aperture 81 therein. Plastic material 83 is then forced into the aperture 81 until no more can be forced thereinto. As the plastic material 83 fills the aperture 81 it pushes around the lower end of the neck 68 into the recess 78 of the guard member 75 as indicated at 85 in Fig. 15. Thereafter the neck of the nozzle is removed from the aperture 81 which leaves the plastic material 84 which flows into the recess 78 above the space of the wall 82 as is shown in Fig. 16. Thereafter the operator preferably uses suitable scraper member 85 to scrape the protruding material 84 into the aperture and moves the plastic material even with the surface of the wall 82 as shown in Fig. 17.

In the use of my device the discharge member enters the joint being filled and the flange around this member engages the surface of the material constituting the filled portion. This provides a tight seal between the parts so that the pressure necessary to force the plastic material into the joint does not cause this material to exude around the joint filler.

From the foregoing description it will be apparent that I have provided a novel joint filling device which is simple in construction and highly efficient in use.

Having thus described my invention I claim:

1. In a joint filler, a cylinder, a discharge nozzle on said cylinder, said nozzle having an elongated discharge aperture, said nozzle having a flange thereon spaced from the outer end of the discharge aperture.

2. In a joint filler, a cylinder, a discharge nozzle on said cylinder, said nozzle having an elongated slot like exit portion, said nozzle including a trowel portion, said trowel portion at its forward edge including a projecting guard.

3. For use in a joint filler, a discharge nozzle, said nozzle having a circular entrance portion and having an elongated slot like exit portion, said nozzle including a projecting guard, said guard having a flange thereon disposed in the rear of the outer end of the guard.

4. For use in a joint filler, a discharge nozzle including a body having an entrance portion and having an exit portion, said exit portion having an outwardly directed flange thereon and a joint smoothing member extending beyond said flange.

5. In a joint filler, a cylinder, a discharge nozzle on said cylinder, said nozzle having a circular entrance portion and having an elongated slot like exit portion, said nozzle including a trowel portion, said trowel portion at its forward edge including a projecting guard, said trowel portion at its rear including a shaping portion having a curved material engaging lower face, said trowel member having a flange thereon disposed in the rear of the outer end of the trowel member, said flange, said guard member and said shaping portion being in alignment.

6. In a joint filler, a cylinder, a piston in said cylinder, a discharge nozzle on said cylinder and adapted to receive material advanced by said piston, said discharge nozzle including a body secured to the cylinder, said body having an entrance portion and having an elongated slot like exit portion, said body including a guard extending beyond the trowel member, said guard at its rear including a shaping portion having a curved material engaging lower face, said guard having a flange thereon disposed in the rear of the outer end of the guard and said shaping portion being in alignment.

7. In a joint filler, a cylinder, a piston in said cylinder, a discharge nozzle on said cylinder and adapted to receive material advanced by said piston, said discharge nozzle including a body secured to the cylinder, said body having a circular entrance portion and having an elongated slot like exit portion, a trowel member molded into said body and including a slot in alignment with the slot of said body, said trowel member at its forward edge including a guard extending beyond the trowel member, said trowel member at its rear including a shaping portion having a curved material engaging lower face, said trowel member having a flange thereon disposed in the rear of the outer end of the trowel member, said flange, said guard member and said shaping portion being in alignment.

8. In a joint filler, a cylinder, a piston on said cylinder, a discharge on said cylinder and adapted to receive material advanced by said piston, said discharge nozzle including a body secured to the cylinder, said body having an elongated slot like exit portion, a guide member slidably mounted on said body adjacent said slot, means to hold said slidable member in position, means to hold the slidable member in position, said slidable member having a flange extending therearound, a support member secured to said flange and a roller member detachably secured on said support.

9. In a joint filler, a cylinder, a piston on said cylinder, a discharge nozzle on said cylinder and adapted to receive material advanced by said piston, said discharge nozzle including a body secured to the cylinder, said body having a circular entrance portion and having an elongated slot like exit portion, said elongated slot like portion having a discharge member secured thereto, a guide member slidably mounted on said body adjacent said discharge portion, means to hold said slidable member in position, said discharge member extending beyond the slidable member, means to hold the slidable member in position, said slidable member having a flange extending therearound, a spring member secured to said flange and a roller member detachably secured on said spring member.

10. In a joint filler, a cylinder, a piston in said cylinder, a discharge nozzle on said cylinder, said discharge nozzle including a body having an elongated outlet, a guide member slidable on said cylindrical end, means to lock said guide member in position, said guide member having a radially extending flange thereon.

11. In a joint filler, a cylinder, a piston in said cylinder, a discharge nozzle in said cylinder, said discharge nozzle including a body having an outlet end, a guide member on said end, said guide member having a radially extending flange thereon, said guide member having a recess therein adjacent said cylindrical portion, said recess extending along the cylindrical portion and extending outwardly along said guide member.

12. In a joint filler, a cylinder, a piston in said cylinder, a discharge nozzle in said cylinder, said discharge nozzle including a body having a cylindrical outlet end, a guide member slidable on said cylindrical end, means to lock said guide member in position, said guide member having a radially extending flange thereon, said guide member having a recess therein adjacent said cylindrical portion, said recess extending along the cylindrical portion and extending outwardly along said guide member.

VANCE LINES.